United States Patent [19]
Boll et al.

[11] Patent Number: 5,790,976
[45] Date of Patent: Aug. 4, 1998

[54] ROUTE SELECTION APPARATUS FOR A MOTOR VEHICLE

[75] Inventors: Wolf Boll, Weinstadt; Michael Buck, Winnenden, both of Germany

[73] Assignee: Mercedes-Benz AG, Germany

[21] Appl. No.: 653,764

[22] Filed: May 24, 1996

[30] Foreign Application Priority Data

May 24, 1995 [DE] Germany ............... 195 19 107.2

[51] Int. Cl.$^6$ ............................................ G06G 7/78
[52] U.S. Cl. ............... 701/209; 701/22; 701/25; 701/208; 320/137; 320/107; 340/636; 340/995; 180/65.8
[58] Field of Search ............... 364/443, 449.1, 364/449.2, 424.026, 483, 481, 492; 340/988, 990, 995, 636; 324/426, 436, 76.11, 77.11, 142; 320/48, 17, 39, 137, 155, 107; 439/142, 144, 222, 956, 188, 376; 180/65.2, 65.4, 65.8

[56] References Cited

U.S. PATENT DOCUMENTS

| | | | |
|---|---|---|---|
| 4,077,061 | 2/1978 | Johnston et al. | 364/492 |
| 5,049,802 | 9/1991 | Mintus et al. | 3/2 |
| 5,220,507 | 6/1993 | Kirson | 364/449.1 |
| 5,270,937 | 12/1993 | Link et al. | 364/449.3 |
| 5,359,527 | 10/1994 | Takanabe et al. | 364/449.3 |
| 5,475,598 | 12/1995 | Fushimi et al. | 364/449.3 |
| 5,506,779 | 4/1996 | Kanki | 364/449.3 |
| 5,539,399 | 7/1996 | Takahira et al. | 364/449.1 |
| 5,557,522 | 9/1996 | Nakayama et al. | 364/443 |
| 5,623,194 | 4/1997 | Boll et al. | 320/137 |
| 5,627,752 | 5/1997 | Buck et al. | 701/35 |

FOREIGN PATENT DOCUMENTS

| | | |
|---|---|---|
| 0 638 887 A2 | 8/1994 | European Pat. Off. |
| 40 34 681 A1 | 5/1992 | Germany. |
| 73 11 043 | 11/1995 | Japan. |
| WO 93/09511 | 5/1993 | WIPO. |

*Primary Examiner*—Jacques H. Louis-Jacques
*Attorney, Agent, or Firm*—Evenson, McKeown, Edwards & Lenahan P.L.L.C.

[57] ABSTRACT

A route finder device for a motor vehicle contains a data input unit for inputting one or more destinations for a journey, a road network memory for storing the locations on the network of roads which can be used by the vehicle, a computer unit for determining one or more possible routes from the location to the destination or destinations including energy supply processes which may be required at one or more energy supply locations as a function of the quantity of energy present in the energy accumulator, the energy supply network and the route specific energy consumption, as well as a display unit for displaying the routes determined by the computer unit. When used in electric vehicles, this device permits optimum routes to be found, taking into account charging processes for the traction battery.

10 Claims, 3 Drawing Sheets

5,790,976

ROUTE SELECTION APPARATUS FOR A MOTOR VEHICLE

BACKGROUND AND SUMMARY OF THE INVENTION

The invention relates to a route selection apparatus for a motor vehicle with an energy storage device of prescribed capacity, into which energy can be fed at respective locations of an energy supply network. The invention is suitable for example for motor vehicles which are operated with gasoline or diesel fuel, and whose fuel tank is refilled from time to time at respective filling stations of a customary filling station network. The device is particularly beneficial to electric vehicles whose traction battery, which serves as an energy storage device, has to be recharged from time to time at a charging station of a charging station network. This is because the selection of a suitable route in order to travel from the present location of the vehicle to one or more destinations is of greater significance in the case of electric vehicles, since their range is frequently appreciably shorter than that of gasoline or diesel operated motor vehicles. Also, recharging the traction battery usually requires a considerable time—of the order of magnitude of half an hour or more.

U.S. Pat. No. 5,049,802, discloses a driverless vehicle system in which a multiplicity of electrically operated vehicles are each automatically guided along a suitably established route by a means of a vehicle guidance computer and a laser sensing system. A charging station system for charging the vehicle traction batteries is managed by a stationary computer which additionally performs the function of organizing charging processes for vehicles. For this purpose, the stationary computer communicates with the vehicle guidance computers via a radio wave communication link.

The stationary computer is capable of controlling a plurality of vehicles simultaneously and outputs to the vehicle guidance computers route information and information relating to locations where charging stations have been set up. Specifically, a signal relating to a weak battery which is to be charged, together with information relating to its charge state and the present location of a particular vehicle with respect to the stationary computer is transmitted by the vehicle guidance computer of the vehicle, and the stationary computer subsequently determines the nearest location of a charging station and suggests to the vehicle guidance computer a suitable route in order to reach this charging station. After the station has been reached, the stationary computer controls the charging component of the charging station at which the vehicle is docked, in accordance with the received information relating to the charge state of the battery of the vehicle in question.

Vehicle route finder devices as such are also already known. See, for example, the U.S. Pat. No. 5,220,507 and the periodical article "Pfadfinder" [Pathfinder] ELO 7/1984, pp 20 to 25, in which a road network, for example a street map or a main road network, is stored in a road network memory and is used by a computer unit to suggest to the driver a route from the present location to a desired destination which can be entered via a data input unit, which route is optimized with respect to the distance to be covered or the travel time required, taking into account the given road network, a relevant excerpt from the road network being represented on a screen. The driver is guided by the computer unit during the journey by corresponding marks in the visually represented section of the road network.

An object of the present invention is to provide a route finder device of the type mentioned at the beginning, which suggests to the user a favorable route from the present location to the desired destination or destinations, including intermediate stops which may be necessary during the journey, in order to feed energy into the energy accumulator of the vehicle.

This object is achieved by the route finder device according to the invention, in which an operator uses a data input unit to enter the destination or destinations to be driven to during a journey, as well as further information depending on how the system is otherwise configured. In simpler systems, the user also enters, for example, the present vehicle location and/or the battery charge state and/or the possible energy supply locations himself. The locations which can be reached on the network of roads on which the vehicle can travel, including associated distance information, are stored in a road network memory. The computer unit has access to this memory and determines a route (and if appropriate further alternative routes) from the vehicle location to the desired destination or destinations using the information which can be called up from the memory and the information which has been entered by the user. The computer unit takes into account energy supply processes which may be required at one or more energy supply locations as a function of the quantity of energy presently available in the energy accumulator or storage device, the energy supply network which represents the possible energy supply locations and the specific energy consumption per kilometer of the vehicle. The user is informed on an associated display unit of the route determined by the computer unit.

As a result of the ability of the computer unit to take into account the energy accumulated state and the energy supply processes which may become necessary, it is frequently possible, in particular in electric vehicles, to structure the journey more favorably than without such a route finder device, since most vehicle traction battery charging processes which last a quarter hour, half an hour, one hour or more can be integrated into the structure of the journey in an optimum way, by the computer unit. The implementation in the computer unit of the algorithm which is required for this is within the knowledge of a person skilled in the art, and does not require any further explanation here. Here, for example, known traffic control systems may be assumed which guide the driver from the present location to a destination, taking into account only a stored road network map.

In one embodiment of the invention, the computer unit automatically has access to the locations of the energy supply network, which need not be input manually by the user.

According to another feature of the invention, the computer unit automatically receives access to the information relating to the quantity of energy still present in the energy accumulator of the vehicle, so that this information does not have to be input by the user.

A further development of the invention, relieves the user of the need to input the present location of the vehicle. Instead, the latter is detected by means of a customary vehicle location determining unit, for example a GPS unit, and fed to the computer unit.

In another development of the invention, the information required by the computer unit relating to the route-specific energy consumption can be prescribed by the user in a plurality of stages. Thus, he can prescribe a higher route-specific energy consumption for mountainous terrain or for a traffic jam of which he is aware, than for country sections of the journey with little traffic.

According to still another feature of the invention, traffic report information is fed to the computer unit and can be taken into account when determining the route in order, for example, to avoid a traffic jam or to allow higher route-specific energy consumption for this section.

In yet another embodiment the invention, the computer unit is able to suggest reduced, energy-saving travel speeds along certain route sections if this permits the range of the vehicle to be increased in such a way that, as a whole, the journey proceeds more favorably because an intermediate stop for a further energy supply process is avoided.

In another development of the invention which increases its convenience, in particular locations on the road network which are visited relatively frequently can be stored in coded form and in this way more easily input by the user.

In a particularly advantageous embodiment, the computer unit determines routes also taking into account stopping times at respective destinations, which stopping times can be prescribed by the user for each destination. The computer unit can then use these stopping times in the best possible way for charging processes for the vehicle traction battery which may be necessary.

Another embodiment which is optimized still further, includes a reception device for receiving occupation state information which is transmitted by appropriately set up charging stations of a charging station network for charging electric vehicle traction batteries. In this way, when determining routes, the computer unit can take into account whether, and if appropriate how many, charging locations of a particular charging station are free. This information can be continuously updated, if appropriate.

Other objects, advantages and novel features of the present invention will become apparent from the following detailed description of the invention when considered in conjunction with the accompanying drawings.

DETAILED DESCRIPTION OF THE DRAWINGS

Figure 1:
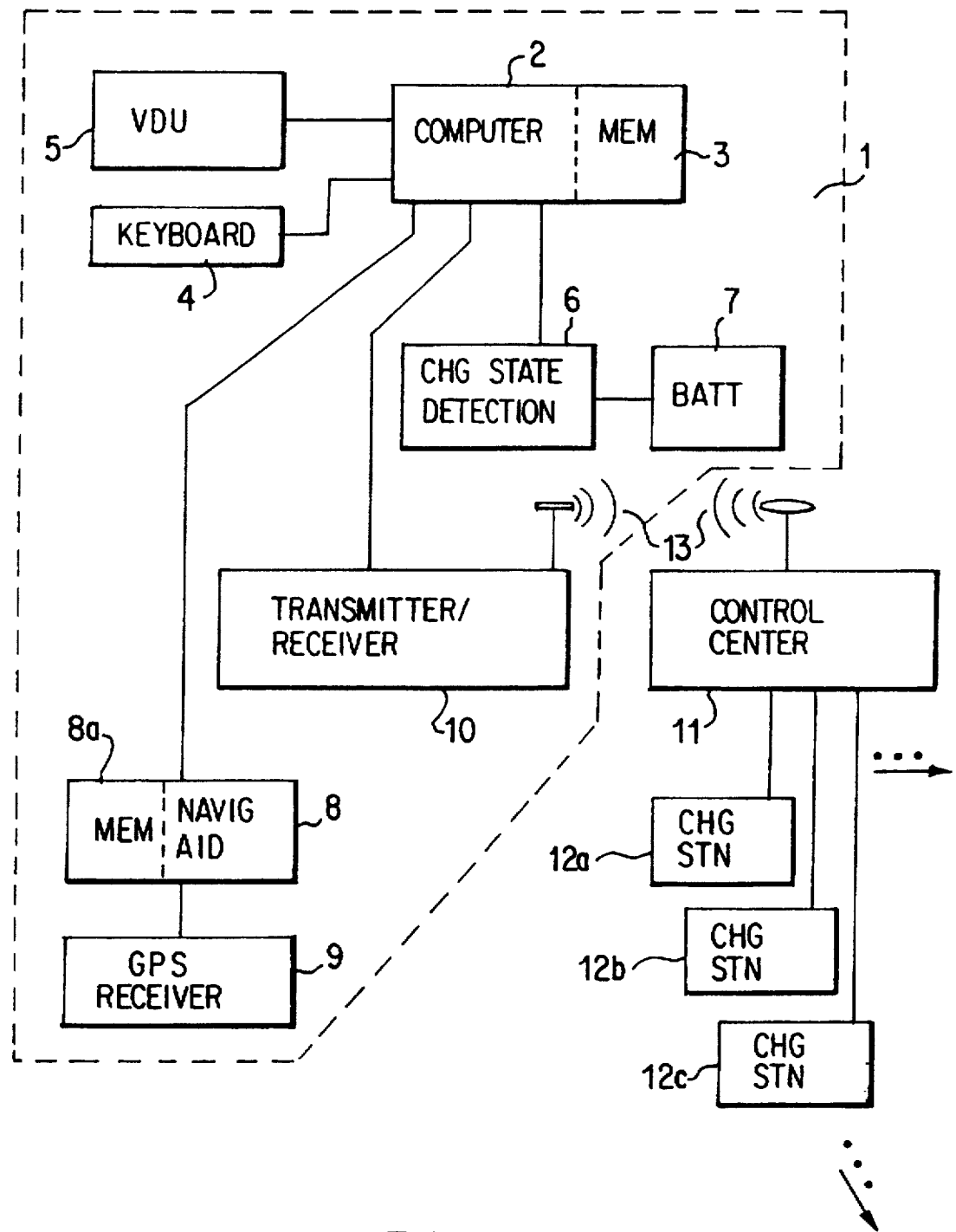
FIG. 1 shows a schematic block diagram of a route finder device according to the invention in an electric vehicle, and a charging station network.

The route finder device shown in FIG. 1 is accommodated in an electric vehicle (1) which is indicated schematically with a frame comprising broken lines, and contains, as its core element, a central computer unit (2) with integrated memory (3) in which a charging station network is stored. The charging station network comprises the charging station locations which can be reached via the road network that can be travelled by the vehicle, and at which the traction battery of the vehicle can be charged. Connected to the central computer unit (2) are a keyboard (4) as data input unit and a screen (5) as visual display unit. Furthermore, the central computer unit (2) is connected on the input side to a charge state detection unit (6) which detects the charge state of the traction battery (7) via a corresponding sensor line. In this way, the central computer unit 2 is continuously informed of the present battery charge state. A further input of the central computer unit (2) is connected to the output of a conventional navigation aid (8) which is connected to a vehicle-side receiver component (9) of a GPS location determining system.

The road network on which the vehicle can travel is stored, with the associated locations and distances to locations, in a memory (8a) of the navigation aid (8). Thus, when desired, the navigation aid (8), together with the central computer unit (2), can direct the driver to a destination during a journey by means of an excerpt from a map of the road network which can be represented on the screen. When the road network is stored, the storage of a network of main roads is sufficient if the central computer unit (2) is intended to determine a route taking into account only the range, without the user being provided with detailed help in finding the destination. Consequently, via this input channel, the central computer unit (2) is provided by the navigation aid 8 with information on the road network and on the present location of the vehicle. Therefore, neither the location of the vehicle nor the battery charge state needs to be input into the computer unit (2) by the user in order to determine a route. In simpler, alternative ways of realizing the route finder device, the connection between the central computer unit (2) and a location determining device and/or a unit for detecting the battery charge state can be dispensed the user then entering the corresponding data manually.

The computer unit (2) is connected via a further input to a transmitter and receiver device (10) which is part of a bidirectional radio communication system with which electric vehicles so equipped can communicate via a radio transmission link (13) with a radio communication control center (11). The latter has a data connection to the individual charging stations (12a, 12b, 12c, ...) of the present charging station network, and contains occupation state data concerning the individual charging stations (12a, 12b, 12c, ...) ready to be called up. Such a battery charging station system in which the system users can call up the occupation state of the available charging stations via a wireless communication link is described, for example, in the German Patent Application 195 02 223.8. Via this data connection, it is possible for the central computer unit (2), in the process of determining a route, to include the present occupation state of charging stations which are possible for charging processes along a route and to display the occupation situation to the user.

Furthermore, via this communication link, the central computer unit (2) can receive information on the present operational situation at the relevant charging station, for example with respect to opening times or the presence of a high-speed charging location. With an appropriate system configuration, the central computer unit (2) can also be provided with information on the geographic location of the individual charging stations (12a, 12b, 12c, ...) from the charging station control center (11), which it can use to update its own memory contents relating to this. Alternatively, in this case, the permanent storage of the entire charging station network in the memory (3) of the central computer unit (2) can be dispensed with. If the communication system is configured to be bidirectional, advance reservation of a charging location at a desired charging station at a desired time is possible. If acknowledgements are not requested from the vehicle (1) to this control center (11), it is sufficient to provide, instead of the transmission and reception device (10), merely a reception device for unidirectional data communication with the charging station control center (11).

The hardware and software configuration of the central computer unit 2 is within the knowledge of a person skilled in the art, from the functions which it has to perform, as described here, without more detailed explanation of this being required. Therefore, the method of operation of the route finder device is explained below with reference to several examples.

If the user wishes to obtain a route proposal from the route finder device, via the keyboard (4) he enters the desired destination or destinations and an item of information relating to whether high, normal or low route-specific energy consumption is to be expected during the journey. In order to input data more easily, destinations which occur more frequently can be stored using code number abbreviations and subsequently called up by means of the code numbers. Depending on the system configuration, the user can additionally prescribe the respectively permitted stopping time at a destination as well as priorities for the individual destinations. The stopping times which are entered can be used by the central computer unit (2) to plan battery charging processes into the route without additional time delay. For the route-specific energy consumption estimated by the user, a high level is provided for mountainous terrain and traffic jams, a normal level for normal town traffic and a low level for country journeys with little traffic. According to a further feature of the invention, this route-specific energy consumption information can also be determined automatically by the central computer unit (2) if the topography of the road network is also stored. Moreover, if the central computer unit 2 is connected to a traffic report receiver of the vehicle 1, it can additionally take into account the traffic situation, such as for example the occurrence of traffic jams, in determining the route, in that it suggests detours or includes a higher route-specific energy consumption in the calculations.

As soon as the user has concluded the data input procedure, during which he may, if necessary, call up user information using a help key, the route finder device produces a route suggestion and displays it on the screen (5), as is shown by way of example in the three subsequently described cases of FIGS. 2 to 4. Here, the location of the vehicle which is determined automatically by the system is designated by the letter (S) while the successively entered destinations which are to be travelled to in succession during the journey are abbreviated with the letters of the alphabet, starting with the letter (A). The individual charging stations are coded with the letter (L) and a subsequent consecutive number, a final index X being given if the respective charging station is within the range of the vehicle but is presently completely occupied or not operational. The route with the direction of travel is represented in the form of a location diagram by means of lines with arrows in the left-hand part of the screen. The schematic route plan may, if appropriate, be stored by the navigation aid (8) with an associated excerpt from the road map by means of a corresponding input instruction. The navigation aid (8) can then simultaneously provide more detailed traffic guidance information on the screen.

Supplementary explanatory information is given in the right-hand part of the screen. This explanatory information includes in particular the precise address of the charging stations included in the route and the waiting time necessary for the charging process which is required, which is important for planning the day's timetable. If appropriate, it is indicated that a desired journey cannot be carried out under the specifications which have been made. Additionally, the user can have alternative routes indicated to him if he is prepared to accept detours or relatively long waiting times.

Figure 2:
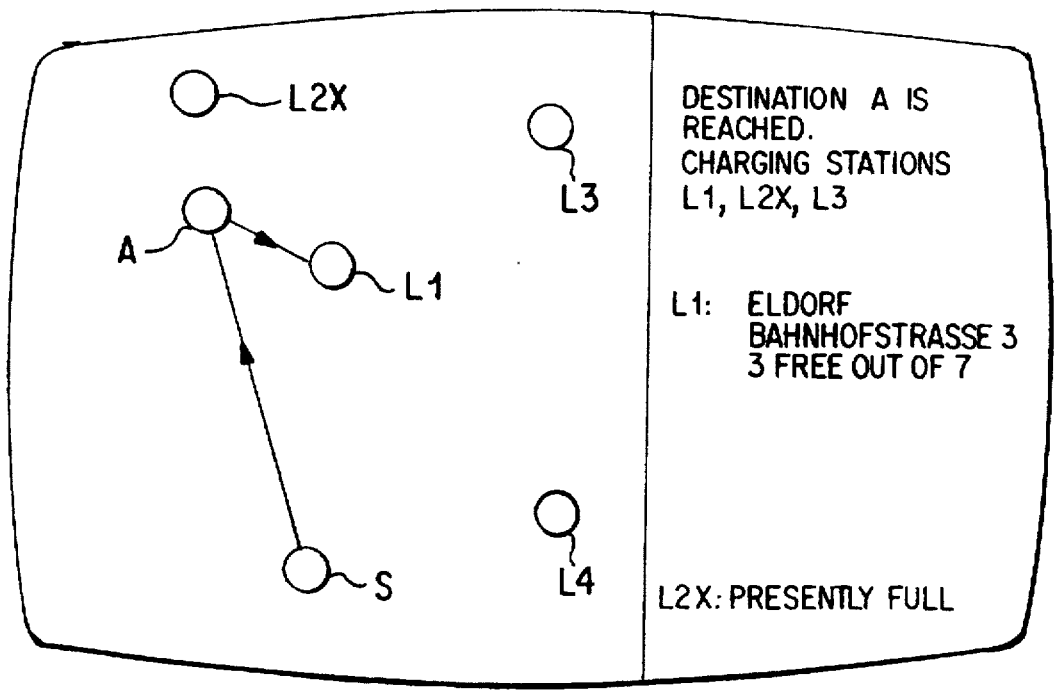
FIG. 2 shows a screen representation which is generated by the device in FIG. 1, with a first exemplary route suggestion.

FIG. 2 shows a route proposal for a journey from the location (S) to a destination (A) for which a normal route-specific energy consumption has been specified. The route finder device indicates that the destination (A) can reached directly with the existing battery charge and that there are four charging stations (L1, L2, L3, L4) within range of the vehicle, three of which charging stations (L1, L2, L3) can also be reached from the destination (A). The charging station (L2) is presently completely occupied. Meanwhile, at the nearest charging station (L1), three of a total of seven charging locations are still free. The route finder device receives this information from the radio communication control center (11) for the charging stations.

If the device is appropriately equipped with the transmission component, the user can subsequently reserve a charging location of the charging station (L1) for the appropriate time, it being possible to display the times of arrival and departure of the vehicles at the respective charging locations of the charging stations. If the user asks for alternatives, the central computer unit (2) does not present an enquiry menu in this case but rather immediately shows the only alternatives which could result from another preselection of the route-specific energy consumption. In the case of high consumption, it would only be possible to reach destination (A), while in the case of low consumption it would be possible to reach the former location S of the vehicle again from the destination A or to reach the fourth charging station (L4).

Figure 3:
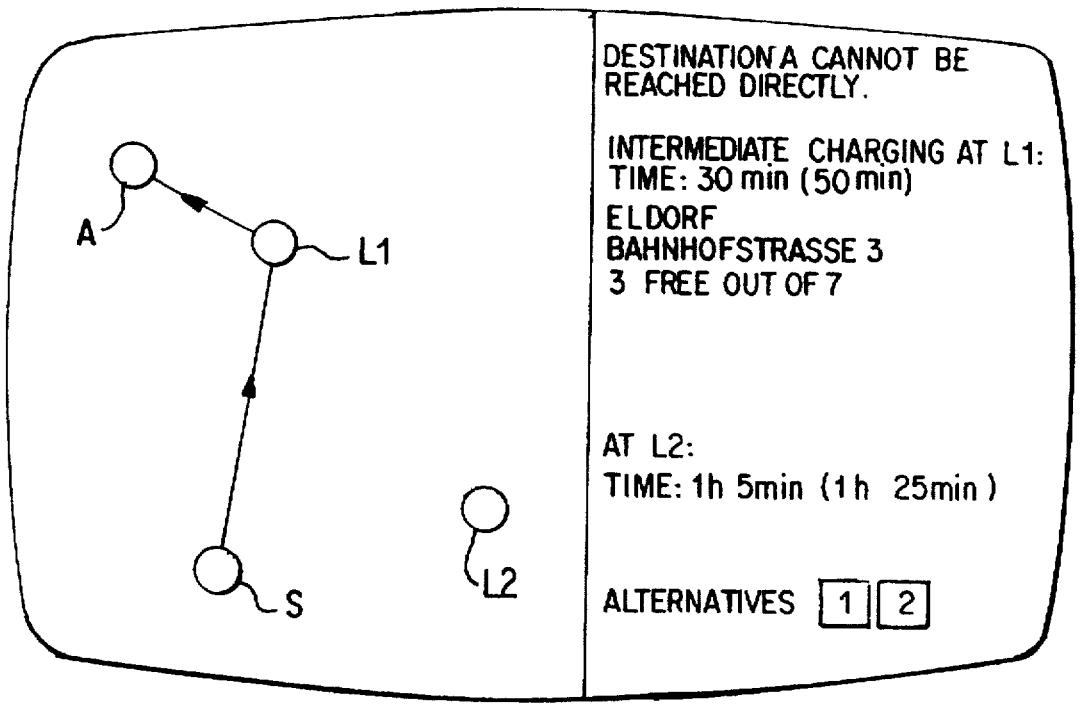
FIG. 3 shows a screen representation according to FIG. 2 with a second exemplary route suggestion.

FIG. 3 shows an example in which the user has entered a destination (A) with a high route-specific energy consumption. The result determined by the route finder device is that the destination (A) cannot be reached directly. There are two charging stations (L1, L2) within range of the location (S) of the vehicle. The route finder device suggests, as the fastest route, intermediate charging at the charging station (L), for which a duration of 30 min can be estimated, in order subsequently to reach the destination (A). The charging duration of 50 min indicated in brackets applies to the case in which a charging process is not possible at the destination (A) and therefore a charging station has to be travelled to again after leaving the destination (A). Alternatively, the route finder device proposes travelling from the location (S) to the second charging station (L2) and performing intermediate charging there with a duration of one hour and five minutes in order subsequently to travel to the destination (A).

If it is not possible to charge the battery at the destination A, a charging duration which is longer by 20 minutes has, in turn, to be included in the plan. The route finder device proposes two alternatives on the screen, which alternatives can be called up with the 1-key or with the 2-key on the keyboard (4). The first alternative is that of travelling to the second charging station (L2) and, after its address and its occupation state have been called up, the said charging station (L2) indicates for example four free charging locations of a total of five. When the second alternative is called up, the route finder device indicates that the destination (A) can be reached directly if only a low route-specific energy consumption is required, and that, subsequently, no further charging station can be reached so that this alternative is only possible if it is possible to recharge again at the destination (A) itself.

In such cases in which a destination can still be reached, if necessary with low route-specific energy consumption, with the presently available battery charge detected by the central computer unit (2), there may also be provision that, at the same time as suggesting the route, the route finder device suggests a reduced traveling speed on certain parts of the route in order to keep the route-specific energy consumption low and thus to increase the range. With this measure, it is also possible, in certain cases, to avoid undesired intermediate charging at a previous destination if this intermediate charging can be performed better at a subsequent destination because, for example, a longer stopping time has been planned there anyway. For this purpose, the system may be configured in such a way that the user enters the desired maximum stopping duration at each destination, which is then taken into account in this way by the route finder device in order to optimize its determination of the route.

Figure 4:
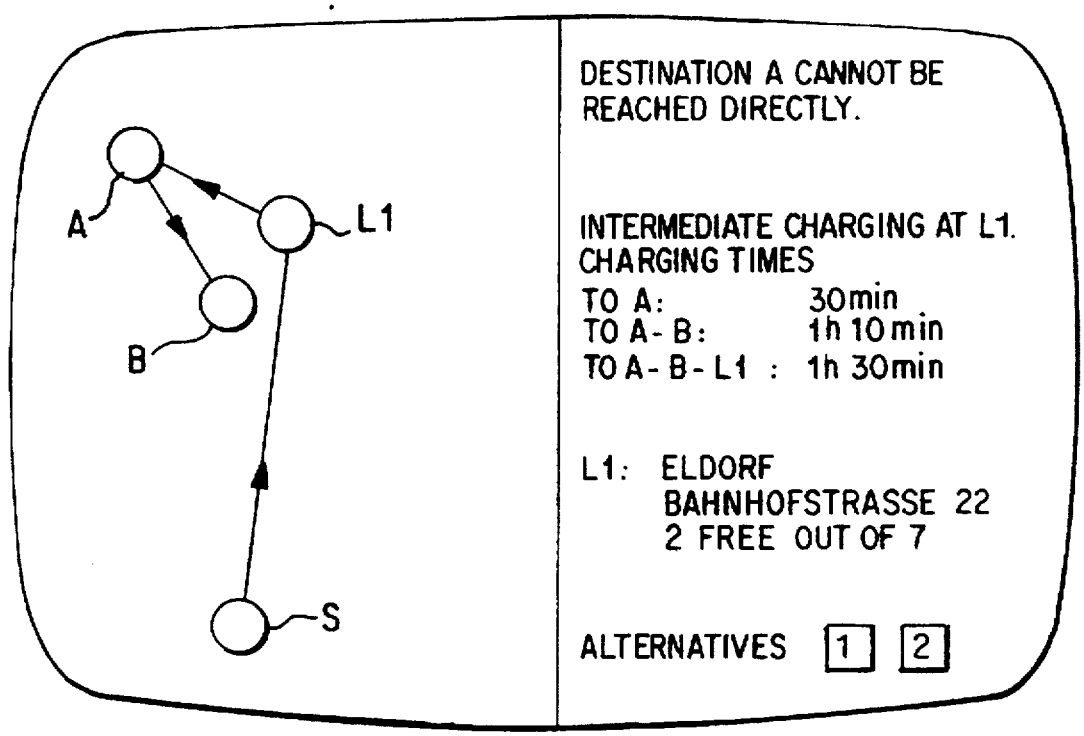
FIG. 4 shows a screen representation according to FIG. 2 with a third exemplary route suggestion.

FIG. 4 illustrates a case in which the user has entered two destinations (A, B) which are to be travelled to successively with low route-specific energy consumption. The route finder device reports that the first destination (A) cannot be reached directly, intermediate charging at a charging station (L1) being required instead. If it is sufficient for the vehicle's range to extend as far as the first destination (A) with subsequent charging of the battery there, the charging time at the charging station (L1) is 30 min; on the other hand, if it will not be possible to recharge until the second destination (B), the charging time at the charging station (L1) will be one 1 h 10 min. If it will not be possible to charge at the second location (B) either, and as a result it will be necessary to travel to the charging station (L1) again, initially a charging time of 1 h 30 min will have to be allowed for at the charging station (L1). With regard to the charging station (L1), its address and its occupation state are indicated; specifically, two of a total of seven charging locations are free.

The route finder device proposes, in addition to the route proposal which is presented with preference, two alternatives, one of which takes into account other charging stations with a new course of the route, while the other indicates a way of realizing the route in the event that the second destination (B) can be travelled to before the first destination (A). In this case, the system determines that the, originally, second destination (B) can be reached directly from the location (S). If charging of the battery can be performed at this location (B), the duration of the charging is 15 min for a range extending to the other destination (A), and 35 min for a range extending to the charging station (L1) via the other destination (A) On the other hand, if it is not possible to charge at the destination (B) which is now the first, it is possible to travel on to the charging station (L1) where the charging duration is then 20 min to reach the other destination (A) and 40 min to reach the further destination (A) and for the subsequent return journey to this charging station (L1).

The examples shown illustrate the method of operation of the route finder device with the design in FIG. 1, the method of operation indicated providing the person skilled in the art with the information required to realize the individual system components of course, within the scope of the invention defined by the patent claims, modifications of the route finder device in FIG. 1 can be realized by means of the possible variants, addressed above, regarding the configuration and presence of the individual system components, for example the omission of an automatic battery charge state evaluation device and/or of an automatic vehicle location determining device and/or of data communication with a communication control center for the charging station network.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Route finder for a motor vehicle having an energy accumulator into which energy can be fed at respective energy supply stations of an energy supply network, said route finder comprising:
   a data input unit for inputting at least one destination for a journey;
   a road network memory for storing locations on a network of roads which the vehicle can travel, and associated distances to locations;
   a computer unit for determining at least one possible route from a vehicle location to said at least one destination, said route including a designation of energy supply processes to be performed at one or more energy supply stations, based on a quantity of energy present in the energy accumulator, location of energy supply stations of the energy supply network, duration of necessary supply processes, and route-specific energy consumption information; and
   a display unit for displaying said at least one route determined by the computer unit.

2. Route finder device according to claim 1 wherein locations in the energy supply network, including distances to such locations, are stored in a memory.

3. Route finder device according to claim 1 further comprising a unit for detecting a quantity of energy present in the energy accumulator, a measurement signal output of this unit being connected to an input of the computer unit.

4. Route finder device according to claim 1 further comprising a vehicle location determining unit whose signal output is connected to an input of the computer unit.

5. Route finder device according to claim 1 wherein information relating to expected route-specific energy consumption on the route between the vehicle location and the at least one destination can be prescribed in a plurality of stages using the data input unit.

6. Route finder device according to claim 1 wherein the computer unit is connected to a traffic report reception device from which it receives traffic report information which it takes into account when determining the route.

7. Route finder device according to claim 1 wherein in order to increase the range, the computer unit suggests energy-saving, reduced travel speeds along certain route sections.

8. Route finder device according to claim 1 further comprising a memory for storing destination addresses using assigned abbreviation codes.

9. Route finder device according to claim 1 wherein:
   said vehicle is an electric vehicle with a traction battery;
   at the user end, stopping times at the respective destinations can be entered using the data input unit, said stopping-times being taken into account by the computer unit when determining the route in order to perform charging processes of the traction battery which may be required.

10. Route finder device according to claim 1 wherein said vehicle is an electric vehicle with a traction battery; and
   further comprising a reception device for receiving information concerning an occupation state at charging stations, which information is transmitted by a communication control center for the charging station network via a wireless data communication link and is taken into account by the computer unit when determining a route.

* * * * *